United States Patent
Daniel

(10) Patent No.: US 10,349,705 B2
(45) Date of Patent: Jul. 16, 2019

(54) QUICK-RELEASE SECURING DEVICE

(71) Applicant: James Marvin Daniel, Bolivia, NC (US)

(72) Inventor: James Marvin Daniel, Bolivia, NC (US)

(*) Notice: Subject to any disclaimer, the term of this patent is extended or adjusted under 35 U.S.C. 154(b) by 0 days.

(21) Appl. No.: 16/018,326

(22) Filed: Jun. 26, 2018

(65) Prior Publication Data

US 2018/0295947 A1  Oct. 18, 2018

Related U.S. Application Data

(63) Continuation-in-part of application No. 15/641,527, filed on Jul. 5, 2017, now Pat. No. 10,070,702.

(60) Provisional application No. 62/358,656, filed on Jul. 6, 2016.

(51) Int. Cl.
*A44B 11/04* (2006.01)
*A01K 27/00* (2006.01)
*B63B 21/00* (2006.01)
*B63B 59/02* (2006.01)

(52) U.S. Cl.
CPC ............ *A44B 11/04* (2013.01); *A01K 27/003* (2013.01); *A01K 27/005* (2013.01); *B63B 21/00* (2013.01); *B63B 59/02* (2013.01); *B63B 2021/004* (2013.01)

(58) Field of Classification Search
CPC .... A01K 27/003; A01K 27/005; A44B 11/04; A44B 13/02; A44D 2200/10; B63B 59/00; B63B 59/02; E02B 3/26; F16M 13/02
See application file for complete search history.

(56) References Cited

U.S. PATENT DOCUMENTS

| | | | | |
|---|---|---|---|---|
| 3,322,102 A | * | 5/1967 | Windle | A62B 35/0006 182/3 |
| 4,638,764 A | * | 1/1987 | Anderson | A01K 27/00 119/770 |
| 5,083,692 A | * | 1/1992 | Treese | B63B 35/7946 224/250 |
| 5,165,584 A | * | 11/1992 | Meagher | A45F 3/14 124/88 |
| D374,325 S | * | 10/1996 | Merrill | D2/627 |
| 5,582,337 A | * | 12/1996 | McPherson | A45F 3/14 224/660 |
| 5,647,522 A | * | 7/1997 | Routh | A45F 3/04 224/250 |
| 6,311,884 B1 | * | 11/2001 | Johnson | A45F 3/04 224/153 |
| 6,318,612 B1 | * | 11/2001 | MacNeil | B60R 9/048 224/330 |
| 6,371,346 B1 | * | 4/2002 | Sharma | A45F 3/14 224/195 |

(Continued)

*Primary Examiner* — Robert Sandy
*Assistant Examiner* — David M Upchurch
(74) *Attorney, Agent, or Firm* — Carla Gannon Law

(57) ABSTRACT

A quick-release securing device is constructed of nylon strap having an openable loop at one end and a fixed circumference enclosure at the other end. The fixed circumference enclosure is preferably a circular securing belt that is attached via a buckle, or slidable loop that is non-removable. The distance between the openable loop and the fixed circumference enclosure, and the circumference of the openable loop, is adjustable. The openable loop can be opened and closed using a buckle.

9 Claims, 11 Drawing Sheets

(56) References Cited

U.S. PATENT DOCUMENTS

| | | | | |
|---|---|---|---|---|
| 6,460,746 B1* | 10/2002 | Amram | A45F 3/047 | 224/579 |
| 6,772,485 B2* | 8/2004 | Alpert | A45C 13/30 | 190/102 |
| 7,125,071 B2* | 10/2006 | Aiudi | A47D 13/02 | 297/4 |
| 7,891,023 B1* | 2/2011 | Hill | A41B 1/08 | 2/305 |
| 8,998,052 B1* | 4/2015 | Mitchell | A45F 3/14 | 224/250 |
| 9,775,328 B1* | 10/2017 | Fidrych | A01K 27/001 | |
| 2003/0093884 A1* | 5/2003 | Doty | B60P 3/079 | 24/302 |
| 2003/0126723 A1* | 7/2003 | McNeal | A44B 11/12 | 24/163 R |
| 2004/0237264 A1* | 12/2004 | Shaw | B60P 7/0823 | 24/68 R |
| 2006/0042562 A1* | 3/2006 | Wagner | A01K 27/001 | 119/792 |
| 2006/0102102 A1* | 5/2006 | Bennett | A01K 27/002 | 119/792 |
| 2006/0130776 A1* | 6/2006 | Fountoulakis | A01K 27/00 | 119/792 |
| 2006/0163301 A1* | 7/2006 | Rhodes | A61J 9/06 | 224/409 |
| 2006/0273128 A1* | 12/2006 | Balakier | A45F 3/14 | 224/578 |
| 2007/0157892 A1* | 7/2007 | Farrell | A01K 27/003 | 119/795 |
| 2008/0000486 A1* | 1/2008 | Wilson | A61G 1/044 | 128/898 |
| 2008/0190980 A1* | 8/2008 | Overton | A45F 3/14 | 224/664 |
| 2011/0154955 A1* | 6/2011 | Fidrych | A01K 27/006 | 81/3.09 |
| 2011/0240694 A1* | 10/2011 | Jackson | A45F 5/02 | 224/255 |
| 2013/0228140 A1* | 9/2013 | Stein | A01K 27/003 | 119/770 |
| 2014/0259551 A1* | 9/2014 | Egbert | A45F 3/14 | 24/302 |
| 2015/0053145 A1* | 2/2015 | Miksovsky | A01K 27/003 | 119/772 |
| 2015/0136825 A1* | 5/2015 | Kalck | A45F 3/047 | 224/653 |
| 2016/0183666 A1* | 6/2016 | Whitehill | A45F 3/02 | 224/578 |

* cited by examiner

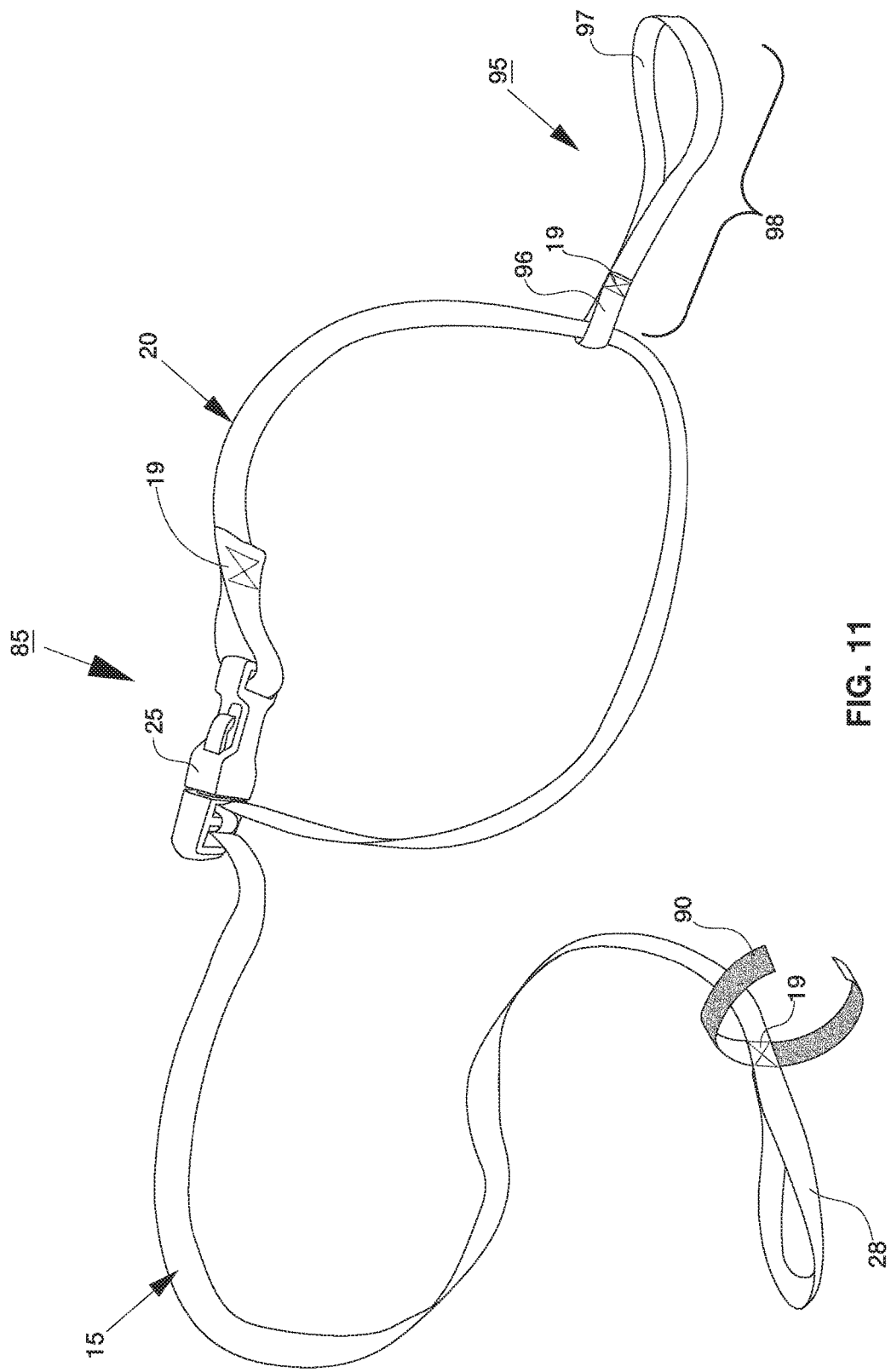

QUICK-RELEASE SECURING DEVICE

CROSS-REFERENCE TO RELATED APPLICATIONS

This application is a Continuation-In-Part Application of United States utility application entitled QUICK-RELEASE SECURING DEVICE, which was filed on Jul. 5, 2017, and assigned the Ser. No. 15/641,527, which issued as U.S. Pat. No. 10,070,702 on Sep. 11, 2018.

The application having the Ser. No. 15/641,527 claims the benefit of U.S. Provisional Application 62/358,656, entitled QUICK-RELEASE SECURING DEVICE, filed on Jul. 6, 2016, which is hereby incorporated by reference in its entirety.

BACKGROUND OF THE INVENTION

Field

The present invention relates to securing hardware, and more specifically, to an adjustable strap system for securing boat fenders.

Related Art

Many boaters carry fenders on their boats, which are used to protect the hull from damage if the boat rocks back and forth while docked. These fenders are typically secured to a boat by a rope fender line that is tied to the fender at one end and tied to a line, rail or other hardware mounted on a boat at the other end. Conventionally, one will adjust the length of the fender line when tying the rope at the boat end in order to raise and lower the fender and secure it over the side of the boat at the proper point of contact for mooring.

Oftentimes a boater will have to untie, adjust and retie a rope to a boat several times before the fender will hang at the proper height and be tightly secured in position.

Unfortunately, knots in the rope are sometimes difficult to untie, and determining the proper knot placement and retying the rope while the boat is in the water can be challenging, so the boater may waste valuable time making these adjustments while trying to dock their boat. Additionally, if the boater does not tie a secure knot, there is risk of the rope detaching and the fender being lost.

As can be seen, there is a need for an efficient device for quickly and easily securing fenders in the proper position on a boat. It is preferred that this device is simple, adjustable, easy to use, and inexpensive to manufacture and transport.

SUMMARY OF THE INVENTION

A quick-release securing device of the present invention is constructed of nylon strap having an openable loop at one end and a fixed circumference enclosure at the other end. The fixed circumference enclosure is preferably a circular securing belt that is attached via a buckle, or slidable loop that is non-removable. The distance between the openable loop and the fixed circumference enclosure, and the circumference of the openable loop, is adjustable. The openable loop can be opened and closed using a buckle. Securing tabs may be included for securing items, or holding securing device to itself.

BRIEF DESCRIPTION OF THE DRAWINGS

FIG. 11 depicts a fifth alternative securing device including a slidable loop.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:
10—Securing device;
15—Primary strap;
17—Secondary strap;
18—Stitches;
19—Interface;
20—Openable loop;
25—Buckle;
26—Supplemental securing device;
27—D-ring;
28—Closed loop;
   28(a)(1)—primary proximal closed loop;
   28(b)(1)—primary distal closed loop;
   28(a)(2)—secondary proximal closed loop;
   28(b)(2)—secondary distal closed loop;
30—Snap hook;
35—Fender;
40—Slider;
   40(a)—Proximal slider;
   40(b)—Distal slider;
45—Center post;
47—Aperture;
50—Supplemental securing belt;
60—Alternative securing device embodiment;
70—Second alternative securing device embodiment;
75—Third alternative securing device embodiment;
80—Forth alternative securing device embodiment;
85—Fifth alternative securing device embodiment;
90—Securing tabs;
92—Hook and loop fastener;
95—Slidable loop;
96—Slidable proximal closed loop;
97—Slidable distal closed loop; and
98—Fixed circumference enclosure.

Figure 1:
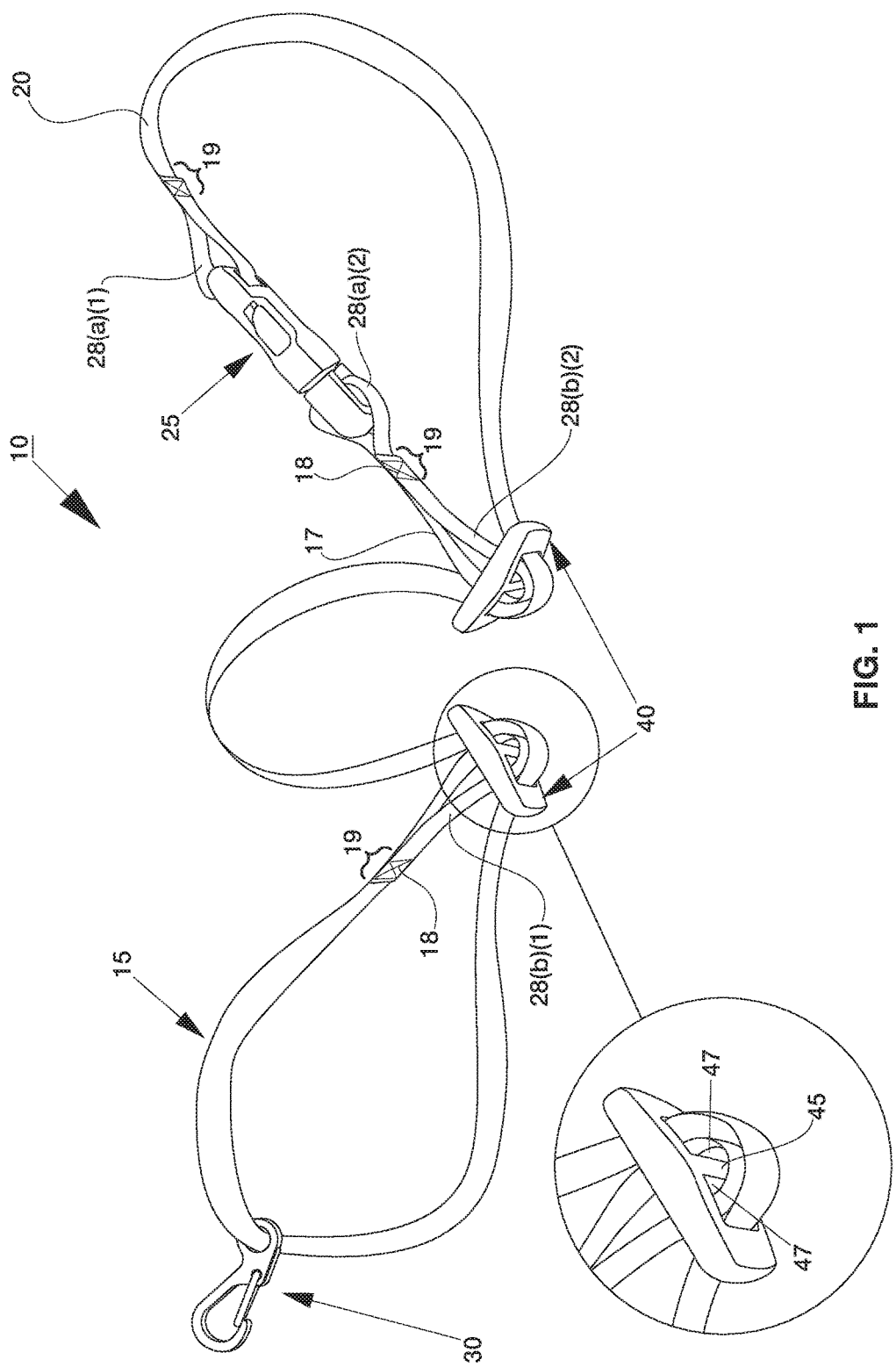
FIG. 1 depicts a securing device.
Figure 5:
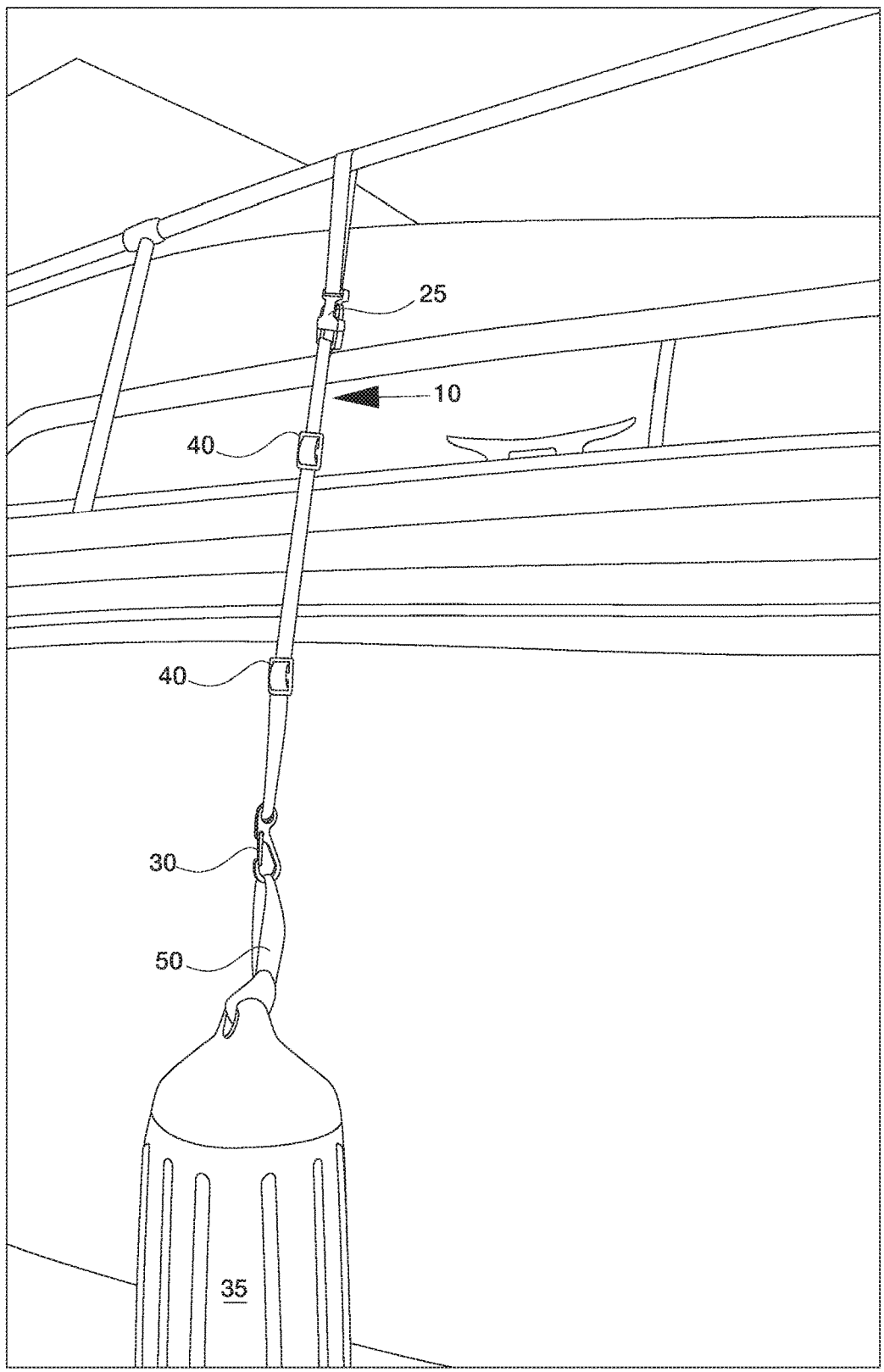
FIG. 5 depicts side of a boat with a securing device hanging from the boat rail and suspending a supplemental strap attached to the top portion of a boat fender.
Figure 7:
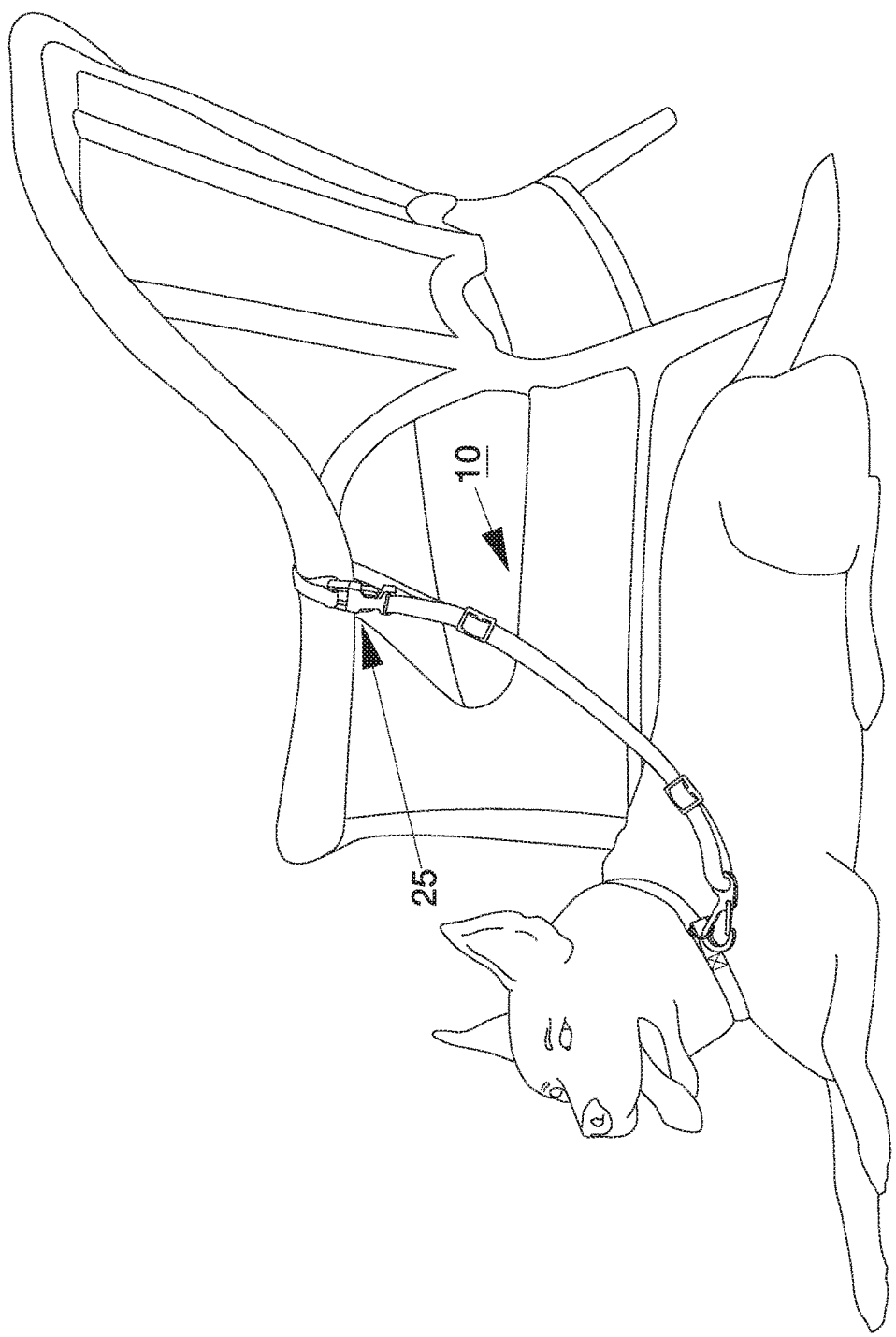
FIG. 7 depicts a securing device restraining a dog.

Referring to FIG. 1, securing device 10 is constructed of primary strap 15, with openable loop 20 at the proximal side, and snap hook 30 at the distal side. As used herein "proximal side" and "distal side" identify regions or ends of the device when the device is stretched out, for example when a device is suspending an item. Openable loop 20 is opened and closed with buckle 25 having two mating sides, thereby allowing device 10 to be attached to a variety of objects by encircling them, for example a boat rail as shown in FIG. 5, or the arm of a chair as shown in FIG. 7. The length of the device can be adjusted using distal slider 40. The circumference of the openable loop can be adjusted using proximal slider 40. Using either slider will adjust the overall length of the securing device because increasing/decreasing the circumference of the openable loop likewise increases/decreases the distance between the proximal side and distal side of device. Primary strap 15 is one continuous strap segment terminating in primary proximal closed loop 28(*a*)(1) and primary distal closed loop 28(*b*)(1), preferably formed by stitching strap portions together with stitches 18 at interface 19. Interface 19 is preferably substantially permanent such that separating is possible but would be difficult and/or is likely to damage straps. Primary proximal closed loop 28(*a*)(1) and primary distal closed loop 28(*b*)(1) of primary strap 15 are located at proximal slider 40 and at buckle 25, respectively. Secondary strap 17 connects distal slider 40 to other end of buckle 25, and includes secondary proximal closed loop 28(*a*)(2) and secondary distal closed loop 28(*b*)(2).

Figure 2:
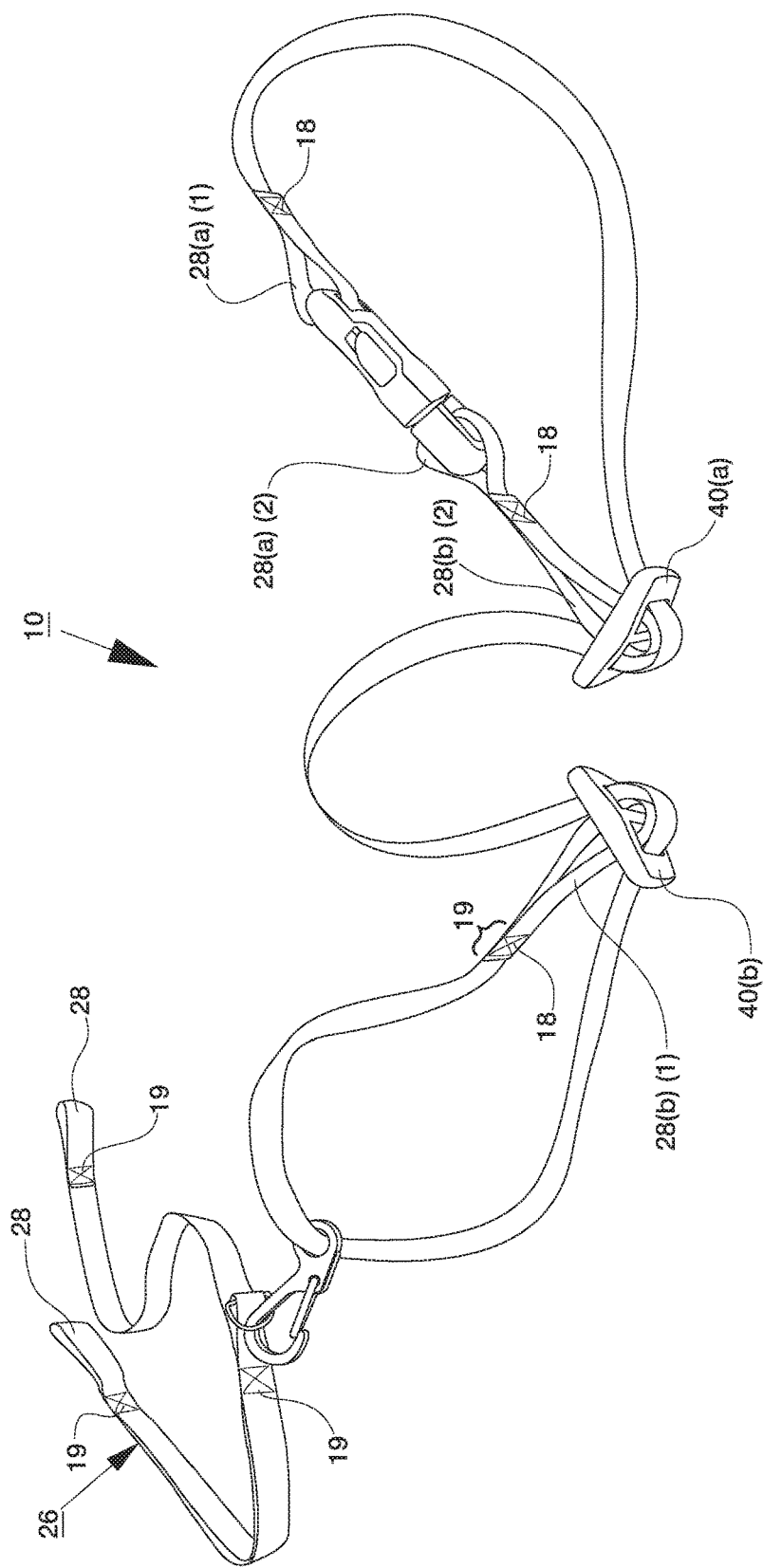
FIG. 2 depicts a securing device, with a supplemental securing device attached.
Figure 6:
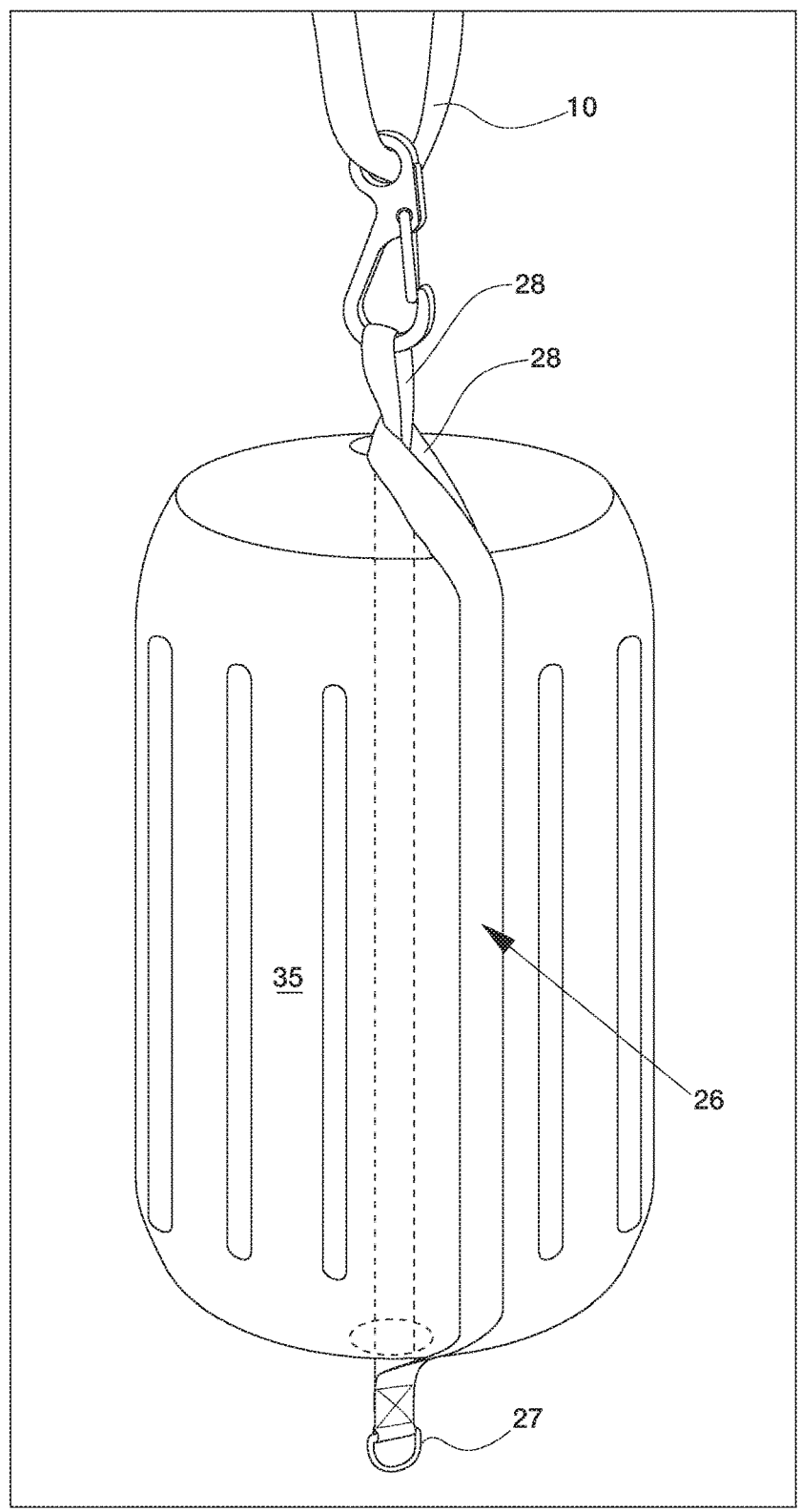
FIG. 6 depicts the snap hook end of a securing device suspending a supplemental securing device attached to a boat fender.

FIG. 2 depicts securing device 10 with supplemental strap 26 attached thereto. Ends of supplemental strap terminate in closed loops 28, and approximately equidistant between the two closed loops 28 is D-ring 27. As shown in FIG. 6, supplemental strap 26 is particularly well suited for threading through boat fender 35 which has a longitudinal channel there through. Supplemental strap 26 can be "looped back through itself" so the protruding loop provides an attachment site for snap hook 30 of securing device. D-ring 27 protruding from bottom of fender 35 can also provide attachment site for snap hook 30 of securing device, particularly where horizontal orientation of fender 35 is desired by employing two securing devices.

Figure 3:
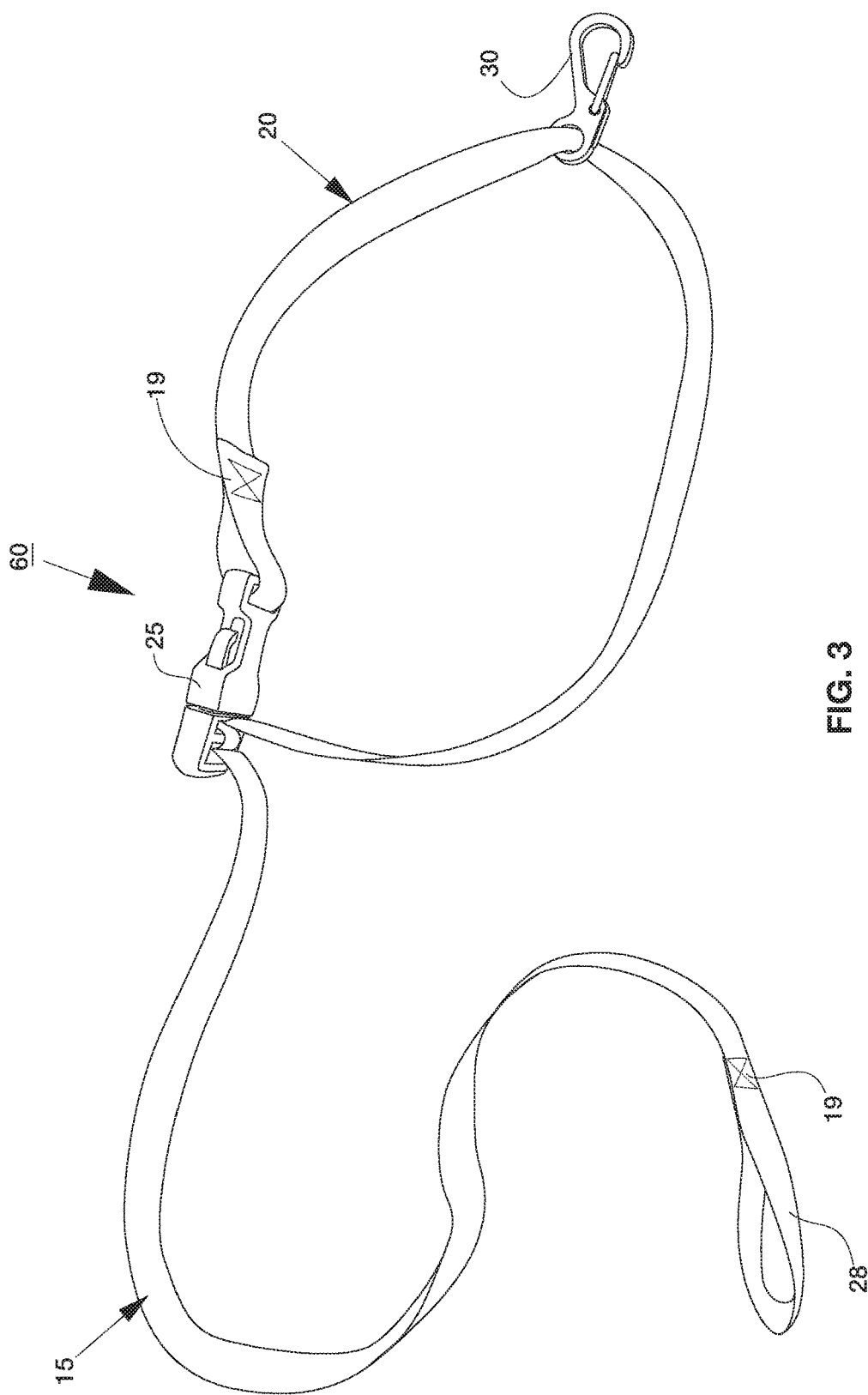
FIG. 3 depicts an alternative securing device.

Alternative embodiment 60 is shown in FIG. 3, and differs from securing device 10 insofar as snap hook 30 is engaged with openable loop 20; there are no sliders 40; there is no secondary strap 17; and distal side terminates in closed loop 28. End-to-end length of alternative embodiment 60 and circumference of openable loop is varied by adjusting length of primary strap 15 through buckle 25.

Figure 4:
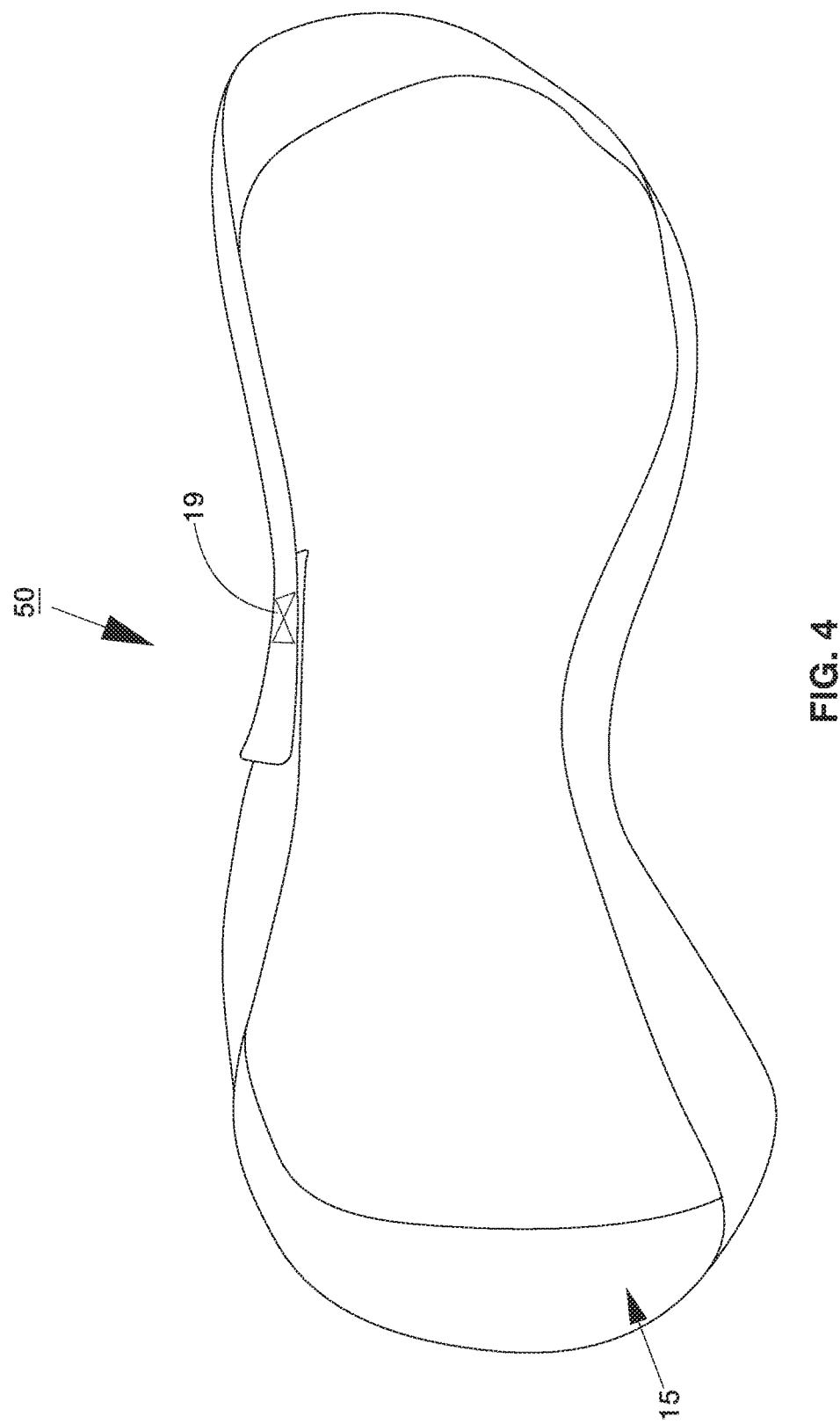
FIG. 4 depicts a supplemental securing belt.

Supplemental securing belt 50 of FIG. 4 includes a section of primary strap with terminal side secured at interface 19. As shown in FIG. 5, supplemental securing belt can be "looped back through itself" to provide a protruding loop which serves as an attachment site for snap hook 30 of securing device 10.

The length of securing device 10 is preferably 8"-24"; 24"-36"; or 35"-72", with the first length indicating the length of the device in the completely shortened state, and the second length indicating the length of the device in the completely extended state, as adjusted by sliders 40. Length of alternative embodiment 60 is preferably 16"-24" in the shortened to lengthened state, respectively.

Primary strap 15 is preferably 1" nylon flat webbing, having a breaking strength of >4,300 pounds, which is commercially available from a variety of sources including Tapecraft Corporation of Oxford, Ala. Snap hook 30 is commercially available from a variety of sources including Prime Industries, Inc. of Virginia Beach, Va. Snap hook is preferably stainless steel. Sliders 40 are preferably tri-glide, and include center post 45 and apertures 47 as shown in FIG. 1. Tri-glide slider is commercially available from a variety of sources including American Cord and Webbing Inc. of Woonsocket, R.I. Buckle 25 is preferably a Side Release Buckle which is commercially available from a variety of sources including John C. Tucker Co., Inc. of Fort Worth, Tex. It is preferred to use marine grade materials in constructing the device. The breaking strength of the securing device is approximately 200-225 pounds.

Supplemental strap 26 is preferably constructed of the same flat webbing as primary strap 15. D-ring 27 is preferably stainless steel D-ring for 1" strap which is commercially available from a variety of sources including Prime Industries, Inc. of Virginia Beach, Va.

Figure 8:
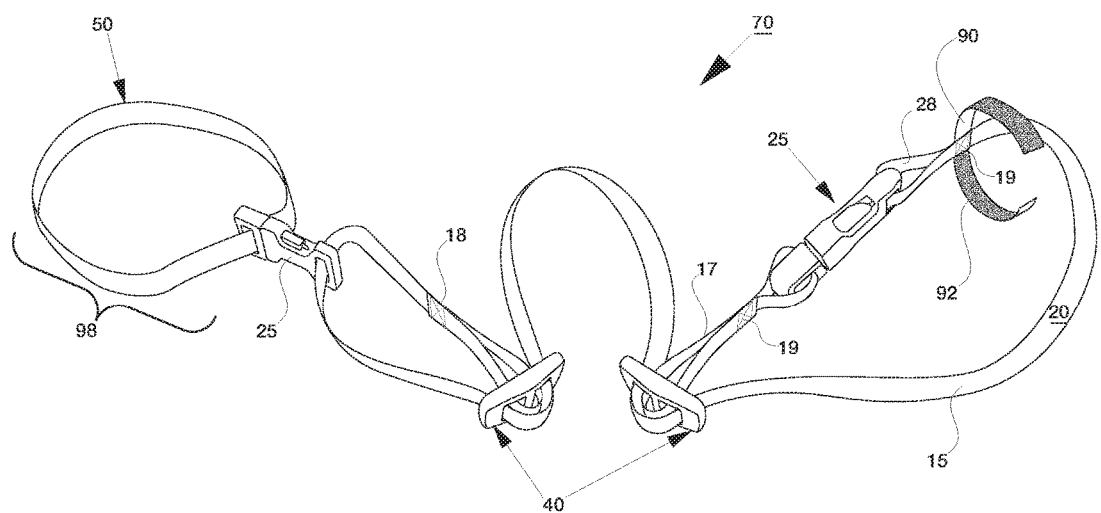
FIG. 8 depicts a second alternative securing device including a buckled-on supplemental securing belt.
Figure 9:
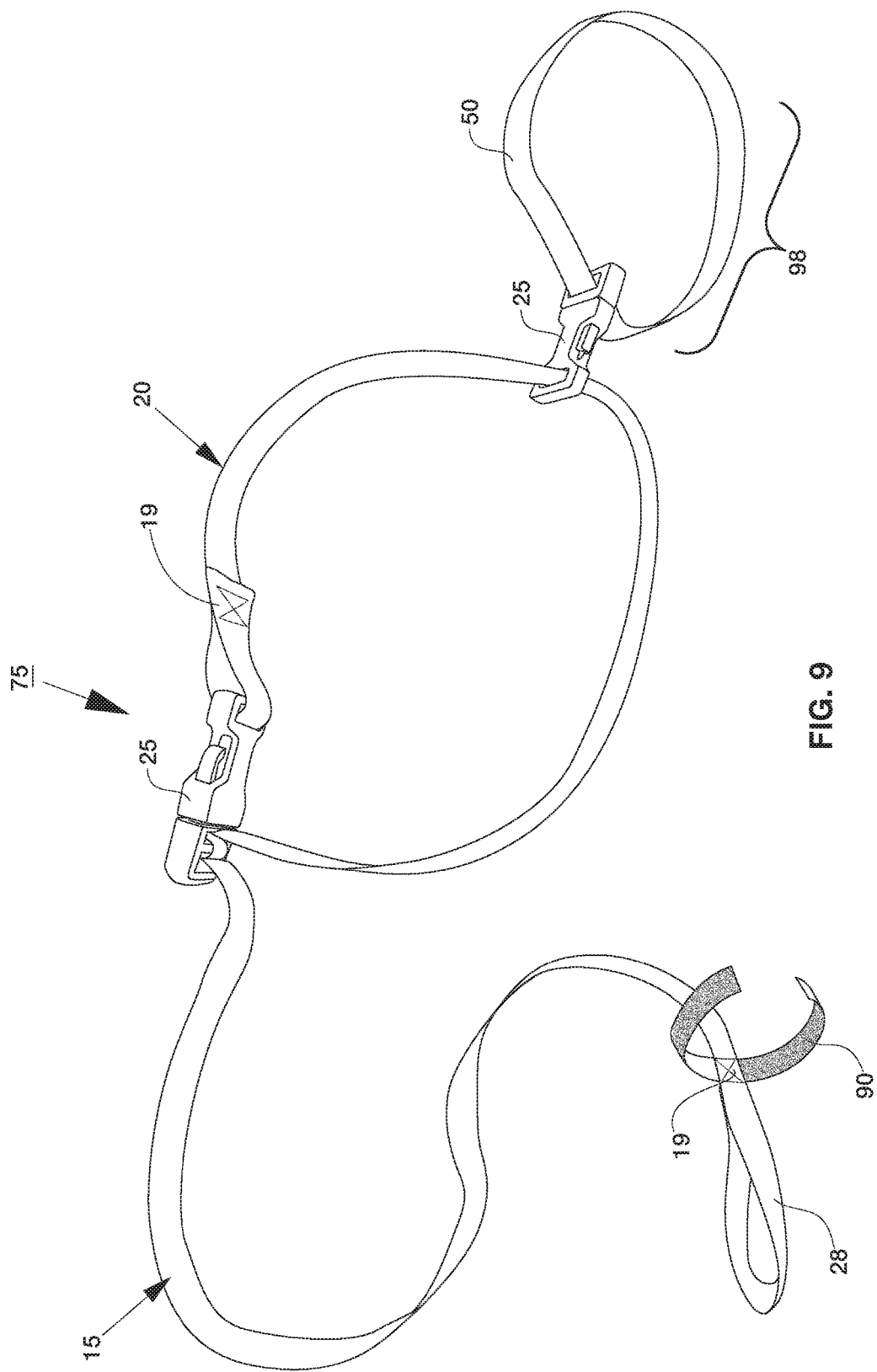
FIG. 9 depicts a third alternative securing device including a buckled-on supplemental securing belt.
Figure 10:
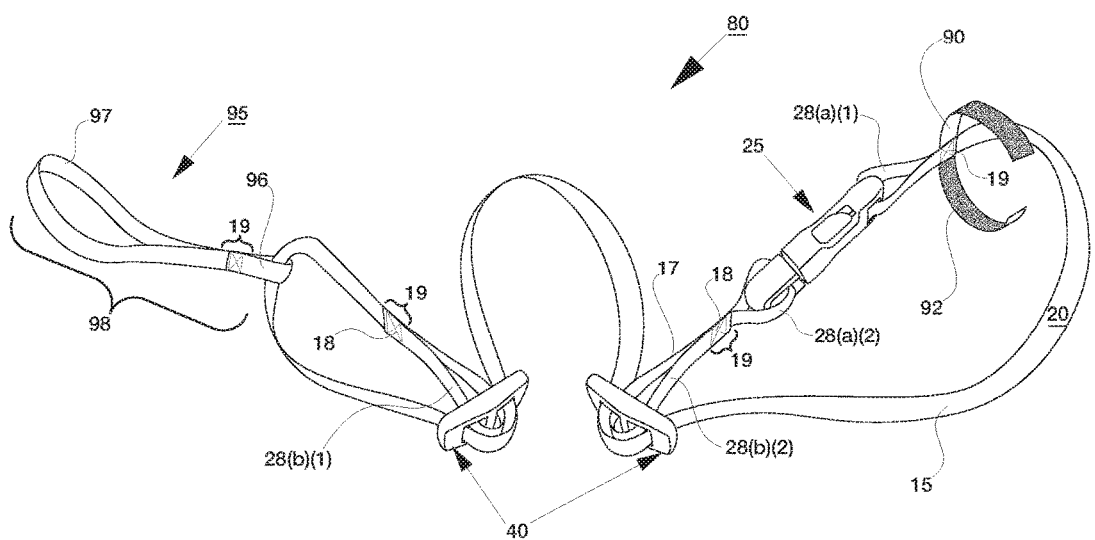
FIG. 10 depicts a fourth alternative securing device including a slidable loop.

As used herein, "fixed circumference enclosure" shall refer to supplemental securing belt 50 of FIGS. 8 and 9, and slidable loop 95 of FIGS. 10 and 11.

Second alternative securing device 70 is shown in FIG. 8. This embodiment is similar to securing device 10 of FIG. 1, except instead of snap hook 30, device 70 includes supplemental securing belt 50 attached to primary strap 15 with buckle 25. In a preferred version, securing tabs 90 including hook and loop fasteners 92 are connected to primary strap 15 at interface 19. Securing tabs can be used for attaching additional items, or for holding together the securing device itself to minimize loose sections.

Third alternative securing device 75 is shown in FIG. 9. This embodiment is similar to alternative securing device 60 of FIG. 3, except instead of snap hook 30, device 75 includes supplemental securing belt 50 attached to primary strap 15 with buckle 25. In a preferred version, securing tabs 90 including hook and loop fasteners 92 are connected to primary strap 15 at interface 19.

Fourth alternative securing device 80 is shown in FIG. 10. This embodiment is similar to securing device 10 of FIG. 1, except instead of snap hook 30, device 80 includes slidable loop 95 attached to primary strap 15. More specifically, slidable proximal closed loop 96 is slidably engaged with primary strap 15, while slidable distal closed loop 97 remains free. Interface 19 attaches segment of webbing together to form slidable proximal closed loop 96 and slidable distal closed loop 97. Slidable loop 95 is structurally similar to secondary strap, for example shown in FIG. 1, except named differently because it is slidably engaged with a strap instead of attached to a buckle. A preferred embodiment includes securing tabs 90 with hook and loop fasteners 92.

Fifth alternative securing device 85 is shown in FIG. 11. This embodiment is similar to alternative securing device 60 of FIG. 3, except instead of snap hook 30, device 85 includes slidable loop 95 attached to primary strap 15. More specifically, slidable proximal closed loop 96 is slidably engaged with primary strap 15, while slidable distal closed loop 97 remains free, with interface 19 there between. A preferred embodiment includes securing tabs 90 with hook and loop fasteners 92.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Rather, it should be understood that all specifications, unless otherwise stated or contrary to common sense, are +/−10%. It should also be understood that ranges of values set forth inherently include those values, as well as all increments between.

What is claimed is:

1. A securing device including:
 a) A primary strap terminating in a primary proximal closed loop and a primary distal closed loop, said primary strap constructed of one continuous strap segment;
 b) A buckle engaged with said primary proximal closed loop;
 c) A distal tri-glide slider defining two apertures and a middle post there between, said primary distal closed loop engaged with said middle post;
 d) A secondary strap terminating in a secondary proximal closed loop and a secondary distal closed loop, said secondary proximal closed loop engaged with said buckle;
 e) A proximal tri-glide slider engaged with said secondary distal closed loop; and
 f) A fixed circumference enclosure engaged with said primary strap, wherein said primary strap and said secondary strap are each engaged with said buckle, and wherein an openable loop is formed by said buckle, a segment of said primary strap, and a segment of said secondary strap.

2. The securing device of claim 1 wherein said primary strap is slidably engaged with said proximal tri-glide slider.

3. The securing device of claim 2 wherein said primary strap is slidably engaged with said distal tri-glide slider.

4. The securing device of claim 1 wherein said primary strap is constructed of 1" nylon flat webbing.

5. The securing device of claim 1 wherein said primary proximal closed loop and said primary distal closed loop include stitches.

6. The securing device of claim 5 wherein said secondary proximal closed loop and said secondary distal closed loop include stitches.

7. The securing device of claim 1 wherein said fixed circumference enclosure is engaged with said primary strap with a buckle.

8. The securing device of claim 1 wherein said fixed circumference enclosure includes a proximal closed loop, said proximal closed loop engaged with said primary strap.

9. The securing device of claim 1 further including securing tabs connected to said primary strap.

\* \* \* \* \*